United States Patent [19]

Hansen

[11] Patent Number: 4,646,774
[45] Date of Patent: Mar. 3, 1987

[54] SNAP-ACTION SERVO MECHANISM
[75] Inventor: Kenneth P. Hansen, Enfield, Conn.
[73] Assignee: United Technologies Corporation, Hartford, Conn.
[21] Appl. No.: 812,418
[22] Filed: Dec. 23, 1985
[51] Int. Cl.⁴ .............................................. F02C 7/12
[52] U.S. Cl. ..................................... 137/110; 60/736
[58] Field of Search ................ 60/736; 137/110, 119, 137/489; 251/75

[56] References Cited
U.S. PATENT DOCUMENTS
3,420,055  1/1969  Lavash ............................... 60/736 X
3,481,356 12/1969  McQueen ........................... 137/110
3,522,817  8/1970  Raymond ........................... 137/489
4,041,697  8/1977  Coffinberry ....................... 60/736 X Primary Examiner—Robert G. Nilson
Attorney, Agent, or Firm—John Swiatocha

[57] ABSTRACT

Snap-action operation of a servo diverter valve (70) and an associated pressure responsive switch (115) is achieved by controlling the pressurization and depressurization of the valve with a nozzle (140) operated by a pressure responsive bellows actuator (160) disposed in a chamber 145 having a flow restrictor 220 in an outlet thereof.

7 Claims, 3 Drawing Figures

SNAP-ACTION SERVO MECHANISM

DESCRIPTION

1. Technical Field

This invention relates generally to hydraulic servo mechanisms and particularly to snap-acting, hydraulic servo mechanisms.

2. Background Art

The prior art is replete with hydraulic servo mechanisms wherein a fluid flow of a relatively high magnitude are controlled by the setting (adjustment) of the position of a servo valve by a fluid flow of a relatively low magnitude. In many cases, a movable servo valve element which controls the higher flow, is provided with lands or equivalent portions with fluid reaction surfaces thereon. The lower flow, selectively directed at the fluid reaction surfaces, moves the servo valve element to desired positions thereof to adjust the higher flow.

A common type of servo mechanism employs a servo valve element movable to discrete positions for purposes of directing a flow therethrough into discrete discharge passages. Clearly, in such a servo mechanism, modulation or "hunting" of the servo valve element between select settings thereof may be unacceptable when maintenance of a single setting thereof is required. Such modulation not only adversely affects the ability of the servo valve to maintain a desired flow, but may also cause premature wear and fatigue of various valve components such as seals and the like as well as preventing accurate signaling of valve position by, for example, electromechanical pressure transducers. Thus, it will be appreciated that it may be desirable for servo valve mechanisms to exhibit "snap-action" operation wherein the valve element moves abruptly, without modulation, between normal operating positions thereof and is maintained at a desired position after such abrupt movement by fluid pressure forces.

DISCLOSURE OF INVENTION

It is therefore among the objects of the present invention to provide an improved snap-action fluid operated servo mechanism.

In accordance with the present invention, snap-action operation of a servo output member is achieved by adjusting the actuation pressure on the output member by conducting a flow of servo fluid which defines the actuation pressure through a nozzle the opening of which (flow area therethrough) is controlled by a closure member operated by an actuator responsive to flow through the nozzle. Movement of the servo output member is effected by increasing or decreasing the net force on the actuator with the nozzle flow. The hydraulic response of the output member and pressure responsive actuator are such that movement of the actuator to achieve a desired response of the output member is effected prior to movement of the output member itself to achieve positive snap-action response thereof to variations in actuator settings.

In the preferred embodiment, the servo output member comprises a jet fuel diverter valve element reciprocatable within a mating cylinder in response to servo pressure on the valve element. The magnitude of servo pressure on the valve element is controlled by the nozzle flow which is in turn controlled by a closure member operated by a fluid responsive bellows actuator. The bellows actuator is disposed in a chamber having an opening with a flow restrictor therein. In operation, the flow restrictor causes a delay in servo fluid flow through the chamber thereby enhancing the pressurization of the bellows by the nozzle flow to achieve the snap-action response of the element noted hereinabove.

BEST MODE FOR CARRYING OUT THE INVENTION AND INDUSTRIAL APPLICABILITY THEREOF

The invention herein is described within the context of a fuel handling system for a gas turbine engine such as that used to power military and commercial aircraft. However, it will be understood that this invention has equal utility in any application in which an hydraulic servo mechanism is employed.

Figure 1:
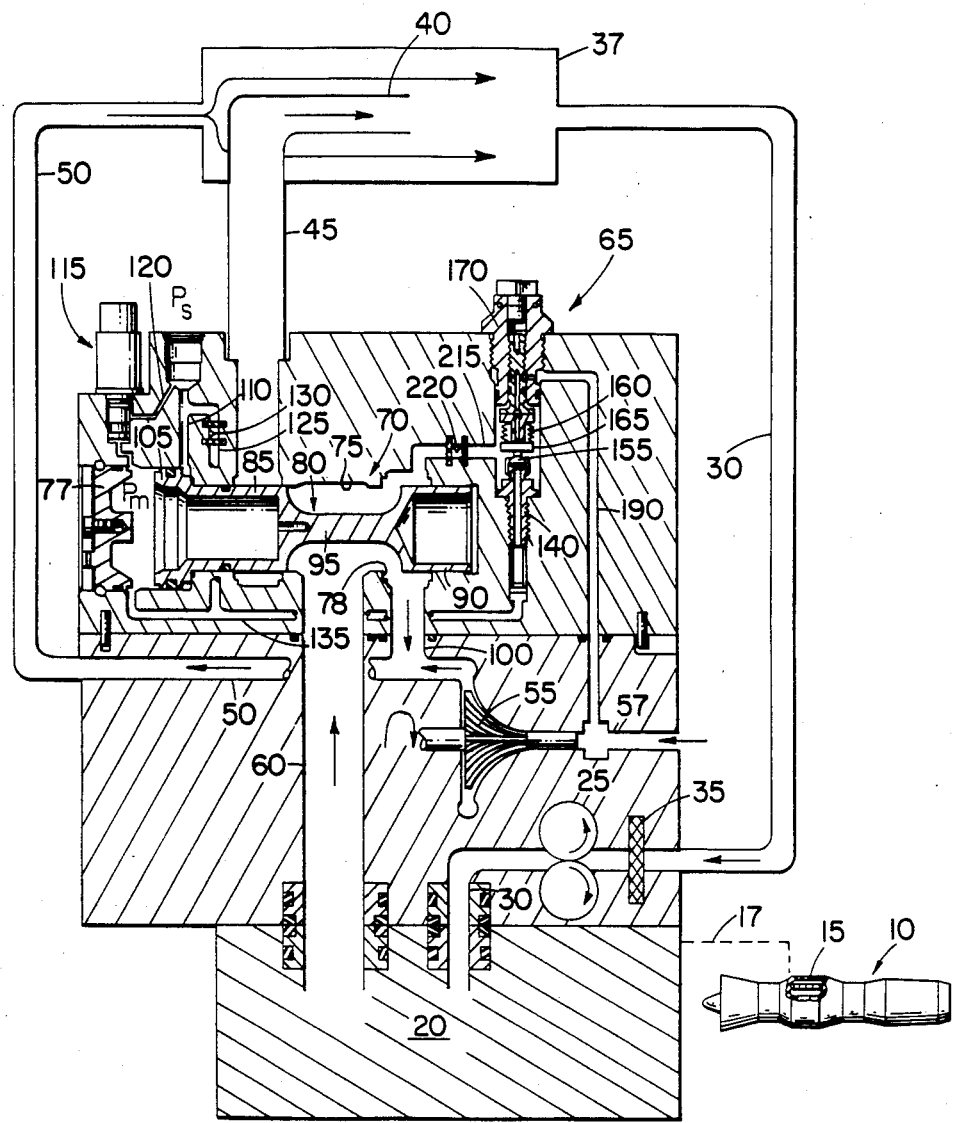
FIG. 1 is a schematic representation of the snap-action servo mechanism of the present invention.

Referring to FIG. 1, a gas turbine engine 10 includes a number of burners, one of which is shown at 15, supplied with jet fuel through line 17 from a fuel control 20 such as, for example, a JFC-60 fuel control manufactured by the Hamilton Standard Division of United Technologies Corporation. Fuel control 20 is supplied with fuel from gear pump 25 through line 30 having filter screen 35 therein. Fuel is received within line 30 from first and second concentric heat exchangers 37 and 40. As illustrated, heat exchanger 40 is supplied with fuel through line 45 while heat exchanger 37 is supplied with fuel through line 50. Fuel is received within line 50 from centrifugal pump 55 which draws fuel from an unpressurized reservoir (not shown) thereof, through line 57. Centrifugal pump 55 minimizes the risk of cavitation within gear pump 25 by pressurizing the fluid input thereto. Fuel flow through heat exchangers 37 and 40 may be used for any desired cooling such as for cooling electronic circuitry (not shown) employed in conjunction with fuel control 20.

As those skilled in the art will appreciate, fuel control 20 meters a desired weight flow of fuel to engine burners 15 based upon desired and actual engine operating conditions. To this end, fuel control 20, by means of various fuel handling apparatus employed therein, adjusts the pressure and flow rate of fuel discharged therefrom to the engine. Typically, gear pump 25 provides a greater flow of fuel than is required for engine operation, excess (bypass) fuel being discharged from the fuel control through line 60 in a manner to be described in further detail hereinafter.

The improved hydraulic servo mechanism of the present invention controls the delivery of bypass fuel from line 60 to heat exchangers 37 and 40. Servo mechanism 65 includes a diverter valve 70 comprising a cylinder 75 sealed by stop 77 at the left-hand end thereof the cylinder including an annular chamber 78 at the land end thereof, and communicating with lines 45 and 60. The diverter valve also includes a reciprocatable diverter valve element (output member) 80 disposed within the cylinder. As shown, valve element 80 includes a pair of cup-shaped lands 85 and 90 connected by a medial portion 95 of reduced diameter.

In the illustrated position of valve element 80, bypass fuel delivered to the servo mechanism through line 60 is directed by valve element 80 into line 100 communciating with line 50 through which fuel is discharged from pump 55 to the heat exchangers. As indicated by the arrows, bypass fuel directed into line 100 by the diverter valve is discharged into line 50 for discharge into outer heat exchanger 37 and subsequent delivery to gear pump 25 through line 30. Movement of valve element 80 to the left, opens line 45 and closes line 100 (with land 90) to open a passage from line 60, through the diverter valve, to line 45 for discharge of the bypass fuel into inner heat exchanger 40. The fuel is then discharged into line 30 from heat exchanger 40 for return to gear pump 25 and fuel control 20.

The left-hand end of land 85 is provided with an enlarged piston 105 pressurized at the right-hand face thereof with fuel from a pressurized ($P_s$) source thereof (not shown) through line 110. Inasmuch as lands 85 and 90 are of equal diameter and therefore subject to equal fluid forces applied thereto from that portion of the valve cylinder adjacent reduced portion 95, the position of diverter valve element 80 is determined by the relative magnitude of the pressures on piston 105. Accordingly, in the position shown, it will be understood that if the fluid forces associated with the pressurization of the left-hand face of piston 105 and the interior of land 85 by fuel at a modulated pressure $P_m$, are greater than those associated with the pressurization of the right-hand face of piston 105 by fuel in line 110 at pressure $P_s$, valve element 80 is urged to the right. Conversely lowering pressure $P_m$ sufficiently, causes the fluid forces resulting from pressurization of the right-hand face of piston 105 with fuel at pressure $P_s$ to overcome the forces on the left-hand face thereof, thereby causing the valve element to move to the left into abutment with stop 77.

A fluid pressure responsive electric transducer (switch) 115 is disposed within passage 120 which provides communciation between the end of the diverter valve cylinder and the upstream end of line 110. Switch 115, sensitive to the difference between pressures $P_m$ and $P_s$ at the end of the diverter valve cylinder and thus to movement of the valve element, provides an electric signal indicative of changes in that pressure difference to a suitable electric indicator (not shown) such as a lamp. The left-hand end of the diverter valve cylinder is pressurized with fuel at pressure $P_s$ through line 125 which is provided with orifice 130 therein; and conduit 135.

Figure 2:
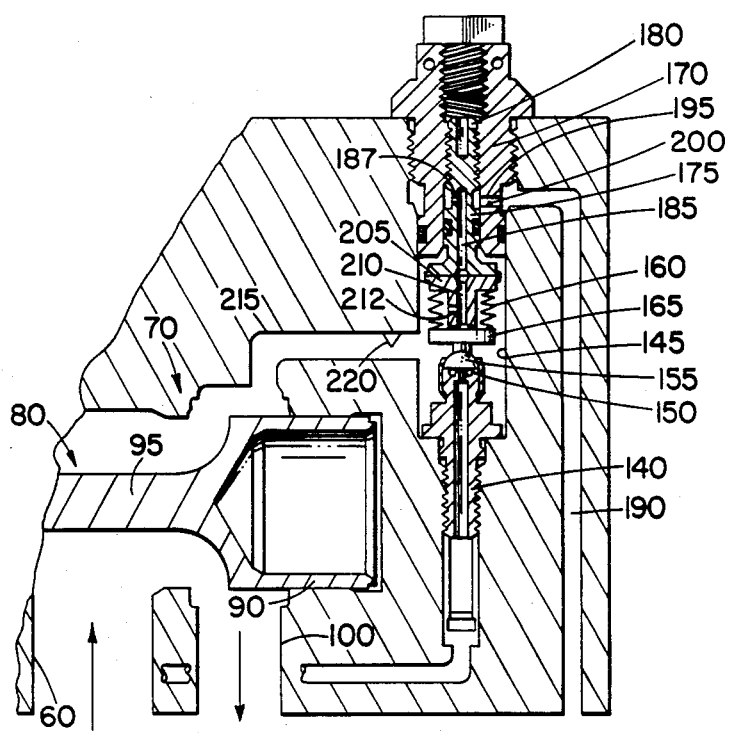
FIG. 2 is an enlargement of a portion of the mechanism shown in FIG. 1.

Referring more particularly to FIG. 2, conduit 135 communicates at an opposite end thereof with a nozzle 140 threaded into a bore extending through the bottom of a chamber 145. The flow area through openings 150 in the upper end of the nozzle is adjusted by a semi-spherical closure member 155 retained within the inturned end of the nozzle. The positon of closure member 155 is set by a fluid responsive bellows actuator 160 provided at the end thereof with a piston output member 165 mechanically connected to closure 155 by any suitable means.

Still referring to FIG. 2, the upper end of chamber 145 is sealed by plug 170 which includes a threaded bore within which bushing 175 is received, the longitudinal position of the bushing being adjustable within the plug by the adjustment of screw head 180 to adjust the trip point of the mechanism. Bushing 175 is provided with a longitudinal and radial fluid passages 185 and 187 respectively, therethrough, passage 185 communicating with low (pump inlet) pressure fuel through line 190 and passage 195 in plug 170, passage 195 being provided therein with orifice 200. Bushing 175 abuts a second bushing 205 disposed within bellows 160 and having longitudinal fluid passage 210 therewithin, this passage communciating with the interior of the bellows through radial passage 212 whereby the bellows is pressurized interiorly thereof with fuel at pump inlet pressure through line 190, passages 195, 187, 185, 210 and 212.

Chamber 145 communciates with outlet pressure from pump 55 through line 215 provided therein with a flow restrictor (orifice) 220, annular chamber 78 and line 100.

As set forth hereinabove, to minimize the wear of diverter valve element 95 and the various other components of the servo mechanism of the present invention in selectively channeling fuel to the heat exchangers, a snap-action operating characteristic of the diverter valve is required. Furthermore, such a snap-action operating characteristic is required to enable the diverter valve element to consistently maintain itself in proper position within the valve cylinder and to enable pressure responsive switch 115 to accurately and continuously indicate such positioning. To achieve such snap-action operation of the diverter valve element, the pressure within the left-hand end of diverter valve cylinder 75 is controlled by controlling the flow of fuel through nozzle 140 by a controlled pressurization of bellows actuator 160.

Assuming, for purposes of illustration of the operation of the servo mechanism, that diverter valve element 80 is in the illustrated position, to divert bypass fuel flow from outer heat exchanger 37 to inner heat exchanger, it is necessary to move diverter valve element 80 to the left. Such movement is effected by, and accompanies an increase in speed of engine 10 which itself effects an increase in speed and thus an increase in output pressure of pump 55. Increasing the pump output pressure increases the pressure within chamber 145 by virtue of its communication with the pump through conduits 50 and 100, valve annular chamber 78 and line 215. Increasing the pressure within chamber 145 in turn increases the pressure drop across bellows 160 (pump inlet pressure remaining constant), thereby causing the bellows to lift piston 165 and closure 155 from the upper end of nozzle 140. This increases the effective opening of nozzle 140 and hence the flow therethrough, thereby lowering pressure $P_m$ at the left-hand end of the diverter valve cylinder. Flow restrictor 220 retards the discharge of nozzle flow from chamber 145 through line 215, thereby enhancing the further pressurization of the bellows, thus causing the bellows to lift piston 165 and hence closure member 155 at an increasing rate.

Figure 3:
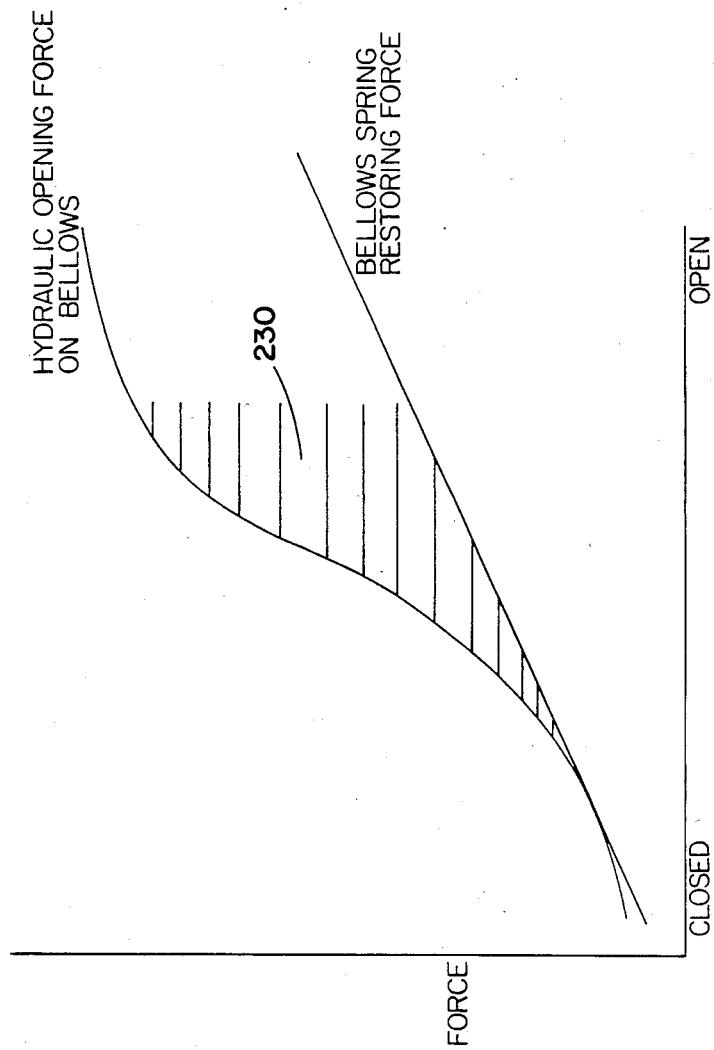
FIG. 3 is a graphical representation of the hydraulic forces acting on a fluid pressure responsive actuator employed in the servo mechanism.

Referring to FIG. 3, it is seen that such retardation of nozzle flow from chamber 145 by flow restrictor 220 causes the rate of change of pressurization of the bellows actuator to increase at a faster rate than the increase in the oppositely directed spring restoring force inherent in the compression of the bellows. Thus, the bellows opens at an enhanced rate under the influence of flow through nozzle 140 as indicated by the shaded area 230 between the curves of FIG. 3, thereby accelerating the depressurization of the left-hand end of the diverter valve cylinder through the nozzle, whereby the diverter valve element snaps positively to the left and is held there by the pressurization of piston 105 through line 110. This positive snap-action of the diverter valve element is indicated by a continuous (nonmodulated) output signal from pressure responsive switch 115.

Assuming that as the speed of engine 10 is lowered, the impeller of pump 55 will slow, thus lowering the pressure within chamber 145. Since pump inlet pressure applied to the interior of bellows 160 remains constant, lowering pump speed in this manner will lower the pressure drop across the bellows. The decreased pressure drop experienced by the bellows causes closure 150 to be lowered under the influence of the bellows inherent spring restoring force. Lowering the closure in this manner, reduces the flow through the nozzle which in turn further lowers the pressure drop across the bellows, flow restrictor 220 minimizing any unwanted repressurization of the bellows exterior through line 215. Lowering the pressure drop in this manner accelerates the closing of the nozzle and thereby allows the left end of piston 105 to be repressurized through lines 125 and 135 for moving piston 105 to the right in a snap-action manner. Such movement rechannels flow from inner heat exchanger 40 to outer heat exchanger 37 and interrupts in a continuous manner, the signal from pressure responsive switch 115.

Those skilled in the art will readily appreciate that the hydraulic flow rate through the nozzle and the response rate of the bellows are chosen so that the bellows responds to changing pump speed (chamber pressure) before piston 105 is actuated by pressure thereon, to achieve the snap-action operating characteristics described herein. As set forth hereinabove, such snap-action operation provides a repeatable and reliable positive, nonmodulating operation of the servo and pressure responsive switch as well as enhancing the service life of such servo components as seals and the like.

Having thus described the invention, what is claimed is:

1. In a servo mechanism having a first output member movable in response to a difference in servo fluid pressure thereacross, the improvement characterized by:
   a nozzle;
   a conduit providing fluid communication between said first output member and said nozzle, to accommodate a flow of servo fluid therebetween, thereby effecting a change in pressurization of said first output member;
   a nozzle closure for modulating said flow of servo fluid through said nozzle;
   a fluid pressure responsive actuator having a second output member mechanically connected to said closure for adjusting the position thereof, said second output member being biased toward a predetermined closure setting by a restoring force associated with said actuator, said restoring force varying with the position of said output member;
   an open chamber providing communication between said actuator and said nozzle for accommodating the application of said servo fluid flow through said nozzle to said actuator in opposition to said restoring force; and
   a first flow restrictor disposed in said chamber opening for restricting flow therefrom, thereby enhancing the pressurization of said actuator by said nozzle flow,
   whereby the rate of change of pressurization of said actuator by said nozzle flow as said closure is adjusted by said actuator is greater than the rate of change of said actuator restoring force thereby maximizing the rate of change of pressurization of said servo mechanism at said one reaction surface for snap-action type movement of said first output member.

2. The servo mechanism of claim 1 characterized by said output member comprising a jet fuel diverter valve element.

3. The servo mechanism of claim 1 characterized by said actuator comprising a bellows, said second output member comprising a movable piston to which said closure is fixed, and said restoring force comprising the inherent spring restoring force of said bellows when said piston is displaced.

4. The servo mechanism of claim 3 characterized by said bellows being adapted for pressurization at the interior thereof, the force with which said closure is adjusted being proportional to the difference between the pressure drop across said bellows and said restoring force associated therewith.

5. The servo mechanism of claim 2 characterized by said servo fluid being supplied from a source thereof to said servo mechanism, adjacent said first output member through a second flow restrictor, said second flow restrictor reducing any effects of direct flow from said servo fluid source through said nozzle.

6. The servo mechanism of claim 1 characterized by means disposed in fluid communication with said first output member for indicating changes in the fluid pressurization thereof.

7. The servo mechanism of claim 6 characterized by said first outut member comprising a reciprocatable member disposed within a cylinder, said means for indicating fluid pressurization changes comprising a fluid pressure responsive electrical switch disposed in fluid communication with said cylinder.

* * * * *